(12) United States Patent
Liu et al.

(10) Patent No.: US 7,120,775 B2
(45) Date of Patent: Oct. 10, 2006

(54) INTER-PROCEDURAL ALLOCATION OF STACKED REGISTERS FOR A PROCESSOR

(75) Inventors: Yang Liu, Beijing (CN); Sun Chan, Fremont, CA (US); Guangrong Gao, Beijing (CN); Dz-Ching (Roy) Ju, Saratoga, CA (US); Guei-Yuan Lueh, San Jose, CA (US); Zhaoqing Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 10/747,426

(22) Filed: Dec. 29, 2003

(65) Prior Publication Data

US 2005/0149918 A1 Jul. 7, 2005

(51) Int. Cl.
*G06F 12/00* (2006.01)
(52) U.S. Cl. ............... 711/170; 711/100; 711/154; 711/156; 711/165; 712/202; 712/228
(58) Field of Classification Search ........ 711/170, 711/100, 154, 156, 165; 712/202, 228
See application file for complete search history.

(56) References Cited

U.S. PATENT DOCUMENTS 5,564,031 A * 10/1996 Amerson et al. ......... 711/209
5,640,582 A * 6/1997 Hays et al. ............... 712/38
6,487,630 B1 * 11/2002 Bui ........................... 711/109
2004/0015901 A1 * 1/2004 Koseki et al. ............. 717/140
2004/0064632 A1 * 4/2004 Lin ........................... 711/100
2004/0237076 A1 * 11/2004 Vedaraman et al. ...... 717/160

OTHER PUBLICATIONS

Rakvic et al., "Performance Advantage of the Register Stack in Intel Itanium Processors," 11 pages, $2^{nd}$ Workshop on Explicitly Parallel Instruction Computing Architecture and Compilers, Nov. 2002.*
G.J. Chaitin, "Register Allocation & Spilling Via Graph Coloring," pp. 98-105, ACM, 1982.*
L. Yang, S. Chan, G.R. Gao, R. Ju, G.-Y. Lueh, and Z. Zhang, "Inter-procedural Stacked Register Allocation for Itanium-like Architecture," Proc. of 2003 Int'l Conference on Supercomputing (ICS), pp. 215-225, Jun. 2003.

* cited by examiner

*Primary Examiner*—Stephen C. Elmore
(74) *Attorney, Agent, or Firm*—Marshall, Gerstein & Borun LLP

(57) ABSTRACT

A method for an allocation of stacked registers for Intel's Itanium® processor includes a three step process. Step I determines an intra-procedural stacked register usage by a program having a plurality of procedures. In step II, the disclosed method performs an inter-procedural analysis to assign quota of stacked register usage to every procedure. In step III, each procedure is allocated stacked register usage based on the quota assignments of step II.

30 Claims, 6 Drawing Sheets

```
1  P = Ø; //P is the set containing all procedures already been included by a hot-region
2  procedure Main(Call_Graph G) {
3     Hot_Region_Set H = Ø;   //A set of hot-regions, it is initialized to empty.
4     do {
5        Hot_Region h = Find_Hot_Region(G); //Find hotspot via traversing the call graph G
6        if (h) H = H ∪ h;
7     } while (h != Ø)

8     for each Hot_Region h∈ H {
9        List L = Construct_Sorted_List(h); //Construct a sorted list for hotspot h
   //Depending on the list, give each proc a budget size
10       Quota_Assignment(L, h);
11  }}
```

```
1  P = ∅; //P is the set containing all procedures already been included by a hot-region
2  procedure Main(Call_Graph G) {
3      Hot_Region_Set H = ∅;   //A set of hot-regions, it is initialized to empty.
4      do {
5          Hot_Region h = Find_Hot_Region(G); //Find hotspot via traversing the call graph G
6          if (h) H = H ∪ h;
7      } while (h != ∅)

8      for each Hot_Region h∈ H {
9          List L = Construct_Sorted_List(h); //Construct a sorted list for hotspot h
   //Depending on the list, give each proc a budget size
10         Quota_Assignment(L, h);
11  }}
```

FIG. 2(a)

```
Hot_Region
12  procedure Find_Hot_Region(Call_Graph G) {
13      Hot_Spot h = ∅;
14      Call_Graph_Node hotspot = NULL;
15      max_weight = 0;
16      for each procedure p∈ G
17      if weight(p) > max_weight
18      hot_spot = p;
19      h = h ∪ {hotspot}; P = P ∪ {hotspot};

//Extend from hotspot to a hot-region
19      Call_Graph_Node x = hotspot;
20      Call_Graph_Node y = callee of x which is called by x most freqeuntly;
21      while ( (y ∉ h) && threshold_callee(x,y) && y ∉ P){
22          h = h ∪ {y}; P = P ∪ {y};
23          x = y; y = most frequent callee of x;
24      }

25      x = hotspot;
26      y = caller of x which calls x most frequently;
27      while ((y ∉ hot_spot) && threshold_caller(x,y) && y ∉ P){
28          h = h ∪{y}; P = P ∪ {y};
29          x = y; y = most frequent caller of x;
30      }
31      return h;
32  }
```

FIG. 2(b)

```
33  List
34  procedure Construct_Sorted_List (Hot_Region h) {
35    L = ∅;
36    for each procedure p ∈ h {
37      for each stacked register r used in p {
38        insert r to L in ascending order of lscs(r)
39    }}
40    return L;
41  }
```

FIG. 2(c)

```
42  procedure Quota_Assignment (List L,Hot_Region h) {
43    count = 0; //Number of accumulated stacked register usage in hotspot h.
44    for every stacked register usage r in L {
45      Call_Graph_Node p = Procedure(r);// p is the procedure in which r is used
46      if (count < bound)
47        if (!Self_Recursive(p)) { //so no rse cost should be considered
48          count++;
49          p→quota++;
50        } else { //Else,i.e., p is a self-recursive procedure
51          int cost = Call_Edge_Freq(p→p)*per_cost;
52          if (lscs(r) > cost) { //If keep the quota is more beneficial
  //The number of accumulated stacked register usage increase one
53            count++;
54            p→quota++;//The quota of procedure p increase one
55          }
56        }//End of else
57      } else { //count >= bound, that is, accumulated stacked register usage exceeds bound
58        for each callee s of procedure p and s∈h
59          cost = cost + Call_Edge_Freq(p→succ)*per_cost;
60        if (lscs(r) > cost) {
61          count++;
62          p→quota++;
63      }}}//End of else
64  }
```

FIG. 2(d)

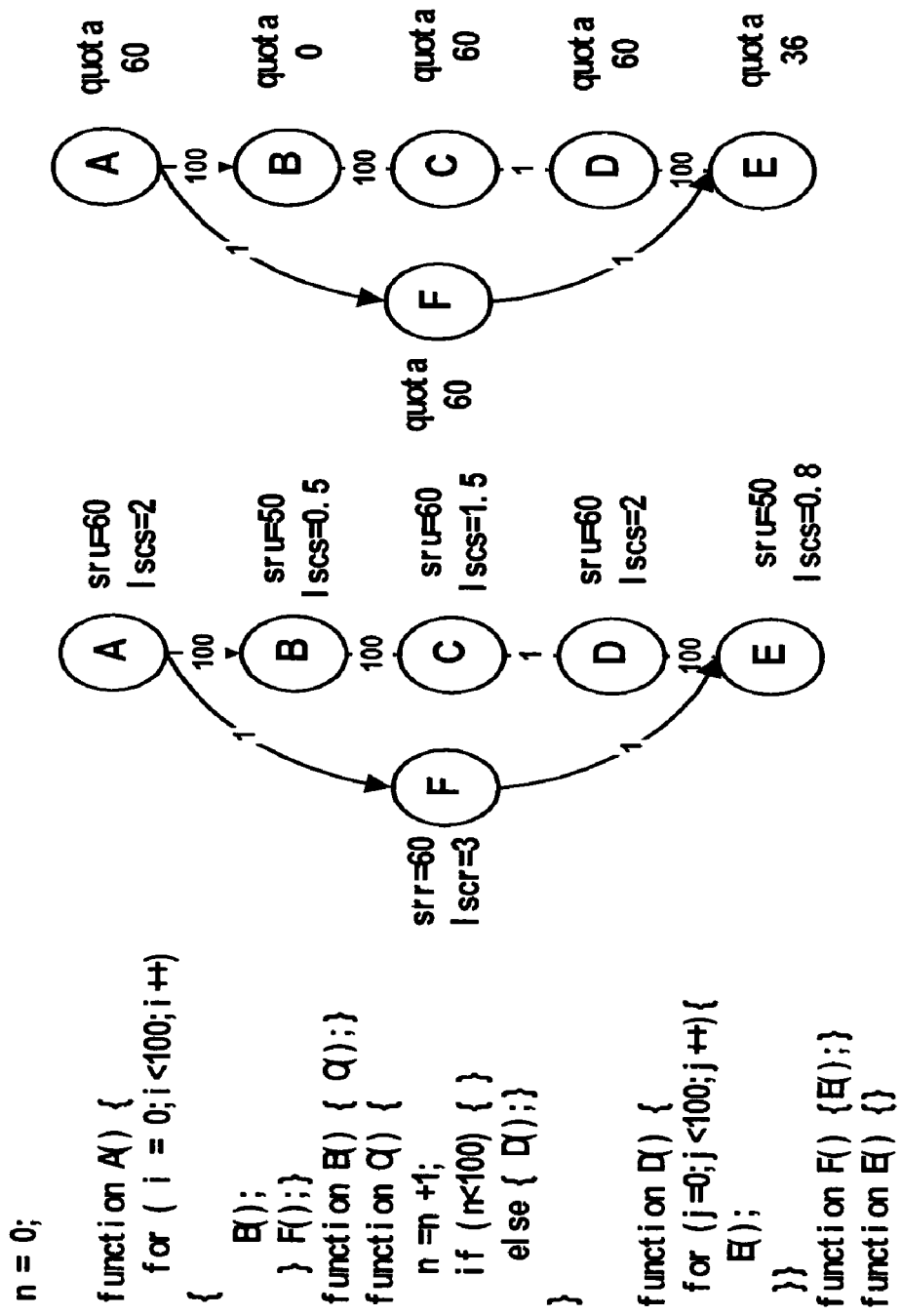

```
//Set of Hot-Regions
H = ∅
//Current hotspot in remained part of G
Hot_Spot = {C}
//Current Hot-Region
h = {C}
//Set P, which contains all procedures
already in a hot-region
P = {C}
```

FIG. 4(a)

```
//Set of Hot-Regions
H = {{A,B,C}}
//Current hotspot in remained part of G
Hot_Spot = {C}
//Current Hot-Region
h = {A,B,C}
//Set P, which contains all procedures
already in a hot-region
P = {A,B,C}
```

FIG. 4(b)

```
//Set of Hot-Regions
H = {{A,B,C},{D,E},{F}}
//Current hotspot in remained part of G
Hot_Spot = {F}
//Current Hot-Region
h = {F}
//Set P, which contains all procedures
already in a hot-region
P = {A,B,C,D,E,F}
```

FIG. 4(c)

```
//Current Hot-Region in processing
h = {A, B, C}
//Sorted List for Hot-Region
L = rc1rc2...rc60rA1rA2...rA60rB1rB2...rB50
//Quota for Every Procedure
A = 60, B = 0, C = 36
//Value of Count
count = 96
```

FIG. 4(d)

```
//Current Hot-Region in processing
h = {A, B, C}
//Sorted List for Hot-Region
L = rc1rc2...rc60rA1rA2...rA60rB1rB2...rB50
//Quota for Every Procedure
A = 60, B = 0, C = 60
//Value of Count
count = 120
```

FIG. 4(e)

```
function A() {                  n = 0;                            A   sru=50
  for ( i = 0;i<100;i++){       function A() {                        Iscs=0.5
    B();                          for ( i = 0;i<100;i++) {
}}                                  B();                           100
                                }}
function B() {                  function B() {
  C();                            n =n +1;                         B   sru=40
}                                 if (n<100)                           Iscs=1.5
                                    {...}
function C() {                  else                               100
  ...                             { for (i=0;i<100;i++){
}                                   C();}}}                        C   sru=50
                                function C() { ... }                   Iscs=2
```

INTER-PROCEDURAL ALLOCATION OF STACKED REGISTERS FOR A PROCESSOR

FIELD OF THE DISCLOSURE

The present application generally relates to allocation of stacked registers, and more particularly, to an inter-procedural allocation of stacked registers for a processor having an architecture similar to Intel's Itanium® processor.

BACKGROUND

Processors typically have no stacked registers inside the processor and are unable to implement a hardware-based stack frame architecture. An application calling a new procedure requires a task switch operation, in which the current stacked register information needs to be stored on the main memory stack of the calling application. Once the called procedure exits, stacked register data from the calling procedure is repopulated inside the processor from the main memory stack before execution continues. The return values of the called procedure are largely stored in memory with retrieval requiring expensive memory reads.

Intel's Itanium® processor includes 128 general integer registers. The first 32 registers, i.e., r0–r31, are static registers, which are visible to all procedures. The remaining 96 registers, i.e., r32–r128 are stacked registers, which are local to each procedure. The set of stacked registers visible to a given procedure is called a register stack frame. Intel's Itanium® processor also includes a Register Stack Engine (RSE), which is responsible for mapping a register stack frame to stacked registers in the physical register file. When a procedure is called, the stacked registers are renamed such that caller's first register in the output area becomes r32 for the callee. The input area of callee starts from the first of caller's area. Parameters passed to callee through the output area of caller's register stack frame. When callee returns, the register renaming is restored to the caller's configuration. This mechanism allows registers of caller to be preserved in register file instead of storing to memory.

If not enough stacked registers are available, RSE will overflow the oldest register stack frames to memory to make room. The overflowed register stack frames will be stored to a memory area called backing store. Once a function returns, RSE restores the register stack frame from backing store to registers. This process is automatically done by RSE and transparent to a compiler.

RSE fills stall program execution. When the total stacked registers allocated from the active procedures on call stack exceeds the allowed stacked register, a stacked register overflow occurs and the program execution is stalled to wait for the completion of RSE processing. Similarly, the RSE fill will also stall the execution. Therefore, maximizing the usage of stacked registers in each procedure may not be optimal as it may cause delays in program execution. In particular, programs with high RSE costs as a percentage of their overall execution cost will be highly affected by RSE fills.

BRIEF DESCRIPTION OF THE DRAWINGS

FIGS. 2(a)–2(d) show a listing of a stacked register quota algorithm in accordance with the teachings of the present disclosure.

FIG. 3(a) shows a listing of an exemplary program used to illustrate a stacked register quota algorithm in accordance with the teachings of the present disclosure.

FIG. 3(b) shows a weighted call graph of the exemplary program of FIG. 3(a).

FIG. 3(c) shows a call graph of the exemplary program of FIG. 3(a) having assigned stacked register quotas in accordance with the teachings of the present disclosure.

FIGS. 4(a)–4(e) show exemplary snapshots of the algorithm of FIGS. 2(a)–2(d) as applied to the exemplary program of FIG. 3(a).

DETAILED DESCRIPTION

A computer system and method for allocation of stacked registers for a processor having a similar architecture as that of Intel's Itanium® processor is disclosed. The disclosed method includes a three step process. Step I determines an intra-procedural stacked register usage by a program having a plurality of procedures. In step II, the disclosed method performs an inter-procedural analysis to assign quota of stacked register usage to every procedure. In step III, each procedure is allocated stacked register usage based on the quota assignments of step II.

Figure 1:
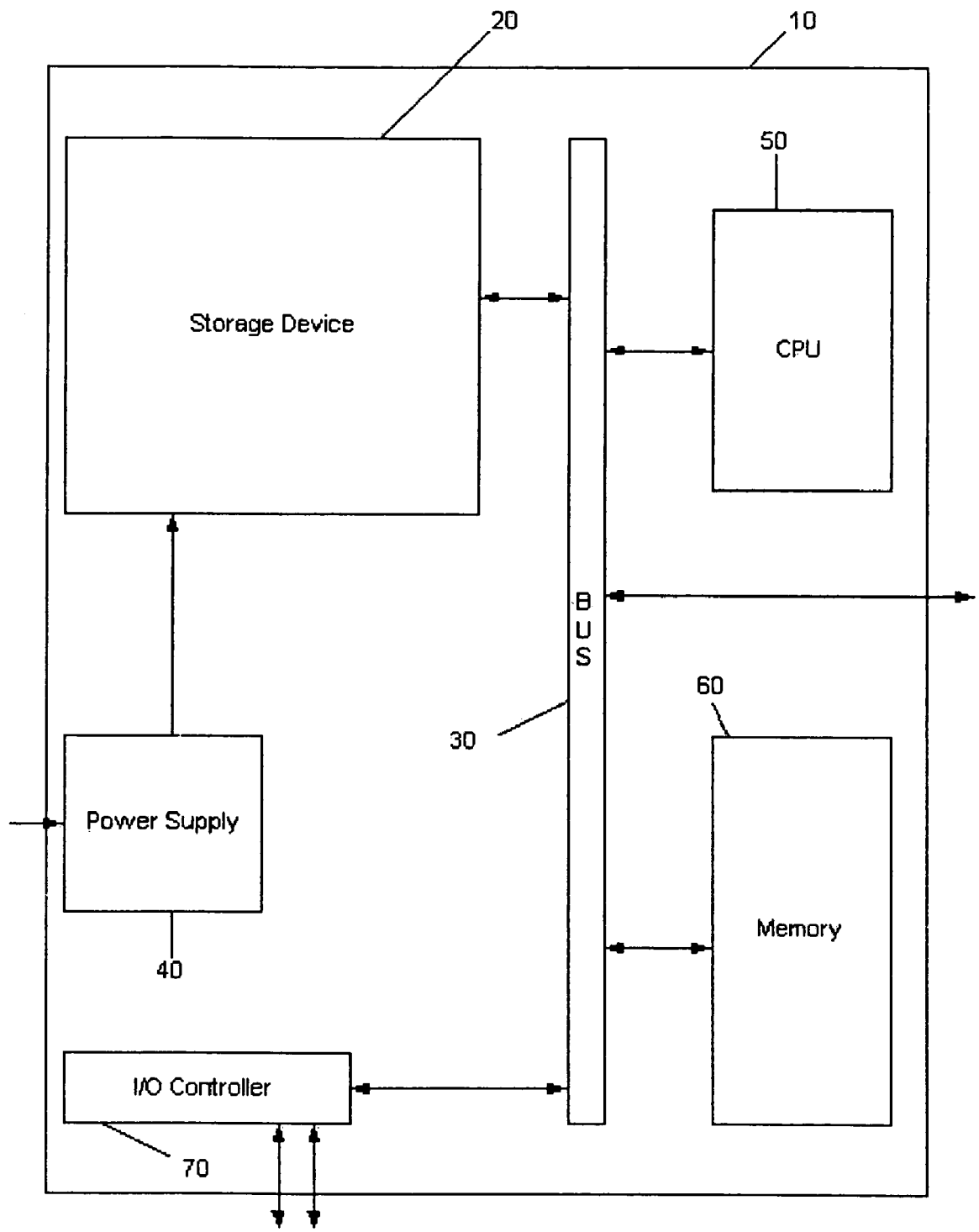
FIG. 1 is a block diagram of a general exemplary computer system employing inter-procedural allocation of stacked registers for a processor constructed in accordance with the teachings of the present disclosure.

FIG. 1 is a block diagram of an example computer system 10 (i.e., a machine) employing an inter-procedural allocation of stacked registers in Intel's Itanium® processor architecture in accordance with the teachings of the present disclosure. As used herein "computer system" refers to any computer system (e.g., portable computer, laptop computer, PDA, desktop computer, server, etc.) that employs a processor having an architecture similar to Intel's Itanium® processor architecture. The computer system 10 of the illustrated example contains many conventional hardware components of a computer system, which include a storage device 20, a communications bus 30, a power supply 40, a processor 50, a memory 60, and an input-output controller 70. Even though the illustrated example of the computer system 10 shows these components internal to the computer system 10, a person of ordinary skill in the art will appreciate that some of these components can alternatively be external to the computer system 10.

The storage device of 20 may be any of the various storage devices used with a computer system such as, an internal drive or an external drive. The computer system 10 also includes a communications bus 30. The communications bus 30 is used to communicate information between various components within the computer system 10 as well as to communicate with communication channels outside the computer system 10.

The memory 60 is used to store data and/or software. It typically includes a volatile memory used to store information temporarily while the computer system 10 is in use. The volatile memory may be implemented by any type of random access memory device such as SDRAM, DRAM, RAMBUS, etc., or any other type of memory used in computers. The memory 60 may also include non-volatile memory, implemented by any known type of read-only memory (ROM) such as flash memory, EPROM, etc.

For the purpose of this description, a machine-accessible medium includes any mechanism that provides (i.e., stores and/or transmits) information in a form accessible by a machine, such as the computer system 10 (e.g., a computer, network device, personal digital assistant, manufacturing tool, any device with a set of one or more processors, etc.). For example, a machine-accessible medium includes recordable/non-recordable media, such as the memory 60 and the storage device 20, as well as electrical, optical, acoustical or other form of propagated signals (e.g., carrier waves, infrared signals, digital signals, etc.).

The illustrated example computer system 10 employs a power supply 40. The power supply 40 is operatively connected to the storage device 20 as well as to a number of other components in the computer system 10 (e.g., the processor 50, the memory 60, etc., as is conventional). The computer system 10 also includes an input-output controller 70 that communicates with a number of input and output devices. The input device(s) permit a user to enter data and commands into the processor 50. The input device(s) can be implemented by, for example, a keyboard, a mouse, a touch-screen, a track-pad, a trackball, etc. The output device (s) can be implemented, for example, by any display device such as a printer, a speaker, a monitor, etc.

The processor 50 is used to manage various resources and processes within the computer system 10. The processor 50 includes a plurality of memory registers that are accessed in a stacked manner, and therefore, are conventionally referred to as stacked registers. The stacked registers are used to store data for local variables, function parameters, and the return address for function calls. High-level language compilers typically compile a program to generate code and incorporate in the code procedures for moving parameters or data between the memory 60 and the staked registers. The code uses the stacked registers to pass parameters to a procedure that is executing in the processor and to retrieve the function's return value for the caller.

The processor 50 includes a hardware implementation inside the processor that automatically manages overflows of the stacked registers of the processor 50. Intel's Itanium® processor family also includes such a stacked register overflow management implementation, which is referred to as the Register Stack Engine (RSE). The RSE helps a subset of the processor's general stacked registers handle stacked register overflows. Each time a procedure is called by a program, it is allocated a group of stacked registers of the processor 50. The allocated stacked registers are temporary locations that store operands local to the procedure and those that are input and output from the procedure. When nested procedure calls exhaust all the available stacked registers of the processor 50, the RSE automatically overflows information from the stacked registers to the memory 60. Thus, the RSE frees up stacked register space for newly called nested procedures. When the stacked register resources on the processor are available again, the RSE moves the stacked register overflow information back into the stacked registers from the memory 60. Accordingly, the RSE performs a load and spill operation each time the stacked register overflows.

One of ordinary skill in the art will appreciate that the RSE or similar hardware implemented stacked register overflow management methods can be implemented on any processor that includes stacked registers. Accordingly, the disclosed method is not exclusive to Intel's Itanium® processor architecture and can be implemented in any type of processor that includes a hardware or software implementation, such as the RSE, for managing overflow of the processor's stacked registers.

The disclosed method minimizes spill-to-memory access time by providing a tradeoff between memory access cycles associated with each explicit load and spill operation, and memory access cycles associated with RSE. As will become apparent in the following, the disclosed method may assign a larger quota to procedures that have a lower RSE cost than the load and spill cost. Conversely, the disclosed method may assign a smaller or zero quota to procedures that have a higher RSE cost than the load and spill cost. In other words, the disclosed method provides a tradeoff between the load and spill cost and RSE cost between the explicit load and store cycles in intra-procedure stacked register allocation in individual procedures and the inter-procedure stacked register allocation, to minimize spill-to-memory access time.

In step I of the disclosed method, which is the intra-procedural stacked register usage estimation step, a weighted call graph G of the procedures in a program is constructed based on performing a first pass intra-procedure stacked register allocation. The weighted call graph G includes the weight of total invocation frequency of each procedure after the first pass. Furthermore, two parameters are estimated for each procedure in step I, a stacked register usage ("sru") and a load/store cycles saved ("lscs"). The sru is in integer form and represents the total number of stacked registers used by each procedure during the first pass. The lscs for a specific stacked register usage is the total load and spill cycles saved by using the stacked register. Depending on control flow in a program, a load and spill operation may not be executed each time a procedure is invoked. Accordingly, the lscs value may be a fractional number. Thus, in step I, the weighted call graph G for each procedure is constructed, which includes the total invocation frequency, the sru, and the lscs of each procedure.

Before proceeding with step II of the disclosed method, however, certain hardware parameters of the processor architecture are also known. Two such hardware parameters are the upper bound of stacked registers ("bound"), and the cost for each stacked register overflow ("per_cost"). Bound represents the number of stacked registers that are available to procedures. For example, Intel's Itanium® processor has 96 stacked registers, and thus, bound for Intel's Itanium® processor is equal to 96.

Step II of the disclosed method, i.e., the intra-procedural stacked register quota assignment step, is shown in FIGS. 2(a)–(d) by an exemplary algorithm. Referring to FIG. 2(a), the first function in the algorithm is Main(G), which initially identifies all hot regions h of the weighted call graph G. A hot region h is a call-intensive trace. Main(G) subsequently stores the identified hot regions h as a set H by calling function Find_Hot_Region (G) repeatedly until all procedures in G are contained by a hot region h. For each given hot region h in H, every stacked register usage r, which is used in a procedure p within h, is inserted in a list L by calling function Construct_Sorted_List (h) in ascending order of lscs. Then quota assignment of stacked register usage is performed by calling function Quota_Assignment (L,h), which calculates the quota for every procedure in hot region h.

In the weighted call graph G, hot regions of interest are where the cost/benefit of stacked register allocation appears to be most significant. Referring to FIG. 2(b), when the function Find_Hot_Region(G) is called repeatedly by Main (G), a hotspot procedure, which is a procedure with the maximum weight, is first selected from the weighted call graph G. A procedure's weight is its total accumulated stacked register usage, which is the product of its total call frequency and stacked register usage. Because the hotspot procedure may be one of several nested procedures, it may be a caller of other procedures and/or a callee to other procedures.

Function Find_Hot_Region(G) finds a hot region by determining whether invocation frequency of the hot spot procedure by a caller of the hotspot procedure is above a certain threshold. The function Find_Hot_Region(G) can also determine whether the invocation frequency of a procedure by the callee of the hotspot procedure is above a certain threshold. For example, a callee threshold is determined by the following equation:

$$callee\_threshold(x, y) = \frac{call\_freq(x \to y)}{called\_freq(x)} > t \text{ \& \& } \frac{call\_freq(x)}{called\_freq(hotspot)} > t'$$

In the above equation, the hot region is extended forward of the hot spot, or extended to procedures called by the hotspot procedure. Also, t and t' are two threshold values decided by a compiler, x is the hotspot procedure, and y is the callee of x, which is a procedure call most frequently by x. Similarly, caller_threshold(x,y) is defined in the function Find_Hot_Region(G) so that the hot region can also extend backward from the hotspot, or extend to procedures calling the hotspot procedure. After each hot region is identified, the Function Find_Hot_Region(G) will be called again by Main (G) to identify more hot regions from the remaining procedures of the weighted call graph G, i.e., the procedures not in any hot region yet.

After the identified hot regions h in set H are processed one at a time in the function Find_Hot_Region(G), every stacked register usage r by procedures p within hot region h is inserted into a list L in ascending order of lscs by calling function Construct_Sorted_List(h) shown in FIG. 2(c). Next, referring to FIG. 2(d), each procedure p within a hot region is assigned a stacked register usage quota by calling function Quota_Assignment(L,h). A first segment of Quota_Assignment(L,h) is shown in lines 46–56 of FIG. 2(d) and is directed to procedures where the accumulated stacked register usage does not exceed bound. The second segment is shown in lines 57–63 of FIG. 2(d) and is directed to procedures where the accumulated stacked register usage exceeds bound.

In the first segment, if the procedure p in which stacked register usage r is used is not a self-recursive procedure, then the stacked register usage r is kept and the quota of procedure p increases by one because there is no RSE cost incurred by procedure p. If procedure p is self-recursive, all stacked registers used by procedure p will overflow per invocation of the procedure p by itself. Therefore, if accumulated stacked register usage does not exceed bound and p is self-recursive, RSE cost caused by r is computed as follows:

Call_Edge_Freq(p→p)*per_cost

For a self-recursive procedure, if lscs is greater than RSE cost, the usage r is kept and quota of p increases by one. However, if lscs is not greater than RSE cost, the quota of p is not increased by one. In other words, the usage r of stacked registers should be taken away to reduce overall memory access time.

In the second segment of Quota_Assignment(L,h), where the accumulated stacked register usage exceeds bound, each additional stacked register usage in p may cause a stacked register overflow per invocation of procedure p. Therefore, once the accumulated stacked register usage exceeds bound, then the accumulative RSE cost caused by each additional stacked register usage could be computed as the product of procedure p's called frequency from its caller in the hot region and the per_cost, as shown in line 59 of FIG. 2(d). In line 60 of FIG. 2(d), RSE cost and lscs are compared to decide whether stacked register usage r for procedure p should be kept. If a stacked register usage r should be kept, the number of stacked register usage in the hot region is also increased by one. Thus, every procedure gets a quota to guide the intra-procedure stacked register allocation, which is performed in step III of the disclosed method.

In the above-described quota assignment, the overlapping of stacked registers between adjacent procedures in the call chain is not considered in the accumulated stacked register usage computation. The overlapping of stacked registers occurs when passing parameters between procedures. However, if the stacked register is used for passing parameters, the variable count of Quota_Assignment(L,h) that is used for calculating the accumulated stacked register usage does not increase by one.

Referring to FIG. 3(a), an example of the disclosed method based on Intel Itanium® processor's stacked register architecture with a program P is shown. As described above, bound or the upper bound of stacked registers is 96 in Intel's Itanium® processor. Program P includes procedures A, B, C, D, E and F. A weighted call graph G for program P, which includes the caller/callee relations for procedures A–F is constructed as shown in FIG. 3(b). Each edge of the weighted call graph G has the total invocation frequency of the procedure. Each node representing a procedure is annotated with an estimation of its sru and lscs. The estimates of sru and lscs are only exemplary and do not represent actual sru and lscs numbers for the program P. Thus, in step I of the disclosed method, total invocation frequency, the sru, and the lscs are determined for each procedure in program P.

In step II of the disclosed method, the hotspot of program P is first identified. As described above, a method of identifying a hot spot is to calculate the total accumulated stacked register usage of each procedure, which is the product of edge frequency of each procedure and its sru. For procedures A, B, C, D, E and F, total accumulated stacked register usages are 60, 5000, 6000, 60, 5050, and 60, respectively. Referring to FIG. 4(a), procedure C has the highest weight in the weighted call graph G, or the highest total accumulated stacked register usage. Thus, procedure C is the hot spot of the weighted call graph G, and is merged into a first hot region. The first hot region extends backward from hotspot C to its caller B, which satisfies threshold_caller(x,y), and therefore, is added to the first hot region. The first hot region h continues to extend backward from B to A, which satisfies caller(x,y), and therefore, is also included in the first hot region. From C, the first hot region h extends forward to procedure D. However, D does not satisfy threshold_callee(x,y) because the call frequency of C to D is only 1. Therefore D is not included in the first hot region. As a result, the intensive call trace {A, B, C} is identified as the first hot region as shown in FIG. 4(b). Continuing the process of step II, {D, E} and {F} are identified as two other hot regions as shown in FIG. 4(c).

The three identified hot regions are processed one at a time. Hot region {A, B, C} is processed first, and a sorted list L is constructed for the hot region {A, B, C} by calling the function Construct_Sorted_List(h), as shown in FIG. 4(d). Quota assignment is performed for the first hot region by calling the function Quota_Assignment (L,h).

FIG. 4(d) shows the function Quota_Assignment(L,h) when count is equal to bound. When count exceeds bound for a procedure, each additional stacked register usage is decided by comparing the procedure's lscs with its RSE cost caused by exceeding bound. In order to reduce the explicit load and store operation cycles as much as possible, stacked registers are assigned to procedures where the saving in spill cost exceeds the cost of using the stacked registers. When the accumulated stacked register usage on a call path in a hot region exceeds bound, the quota assigned to some procedures is reduced in order to reduce the total spill to memory access cycles.

In procedure B, obtaining each stacked register assignment could save 50 cycles (the invocation frequency of 100 multiplied by lscs of 0.5) in the explicit load/store operation cycles. However, procedure B incurs 100 cycles of RSE. Accordingly, procedure B should not be assigned any stacked registers, and should not be assigned a quota. Taking away procedure B's quota will save 2500 (50×50) load/store cycles. Thus when quota assignment for the disclosed example concludes, procedures A, B and C will be assigned stacked register quotas of 60, 0, 60, respectively as shown in FIG. 4(e). Similarly, the stacked register assignment for hot regions {D, E} and {F} is performed. The final quota allocation for the disclosed example is shown is shown in FIG. 3(c).

Figures 5, 6A, 6B, 6C:
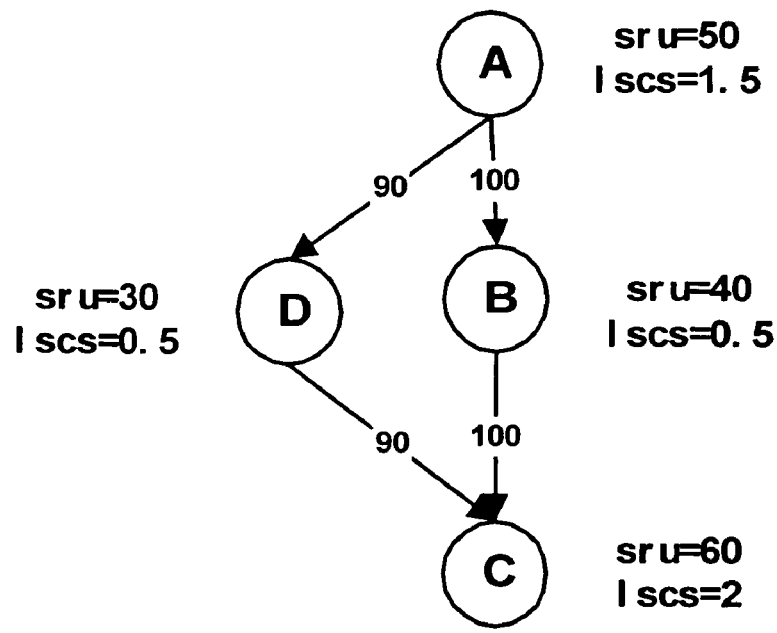
FIG. 5 shows another exemplary program used to illustrate a stacked register quota algorithm in accordance with the teachings of the present disclosure.
FIGS. 6(a)–6(c) show another exemplary program used to illustrate a stacked register quota algorithm in accordance with the teachings of the present disclosure.

The disclosed method can be modified to extend a hot region as described above to an extensive hot region, i.e., an area extending along several call paths instead of only a call-intensive trace. An example of when such a modification may provide a more robust quota assignment is shown in the weighted call graph G of FIG. 5. In the weighted call graph G of FIG. 5, the algorithm will select C as hot spot and extends the hot region along the callers to get hot region {A, B, C}. For procedure D, although the call edge frequency C to D is also high, it is not on the most frequent call path. Thus, procedure D is not included in the hot region. When selecting the next hot region, procedures A, B and C will not be considered because they have already-been in a hot region. Accordingly, the second hot region is procedure D itself. However, a quota assignment for the call path A to D to C remains to be performed. The disclosed method can be modified to extend the hot region {A, B, C} to an extensive hot region, which extends along several call paths. Specifically, we can modify lines 20–24 in Find_Hot_Region( ) to consider all of the callees greater than a certain invocation threshold instead of only the most frequent callee. Similar changes can be made to lines 26–30 in Find_Hot_Region( ) for multiple callers. Accordingly, the disclosed method can perform quota assignments once for every call trace.

In the disclosed example, if the accumulated stacked register usage within a hot region exceeds bound, each additional stacked register usage will cause a stacked register overflow. However, such is not true for all programs. Referring to programs illustrated in FIGS. 6(a) and 6(b), which have the same weighted call graph G of FIG. 6(c), if the accumulated stacked register usage along a call path in G exceeds bound, each additional stacked register usage will cost 100 cycles. However, for the program in FIG. 6(b), each additional stacked register usage of C exceeding bound will cause only 1 cycle for the first time C is called by B. For the other 99 times procedure C is invoked, no RSE cost is incurred, because stacked register contains only stacked register frames of B and C, and the accumulated stacked register usage of the two procedures does not exceed bound. The disclosed method can be modified to provide a dynamic average stack spill cost for every procedure to get more accurate feedback of a procedure's spill cost. Specifically, we can modify the places in Quota_Assignment( ), where count++ is executed. Instead of count++, we can use count+=Exec_Probability(r), where Exec_Probability(r) is the probability that register usage r will be executed with respect to the function entry.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A method of processor stacked register allocation comprising:
    determining stacked register usage characteristics of each procedure of a program having a plurality of procedures, wherein any stacked register overflow caused by the program is automatically managed by a stacked register engine;
    determining a stacked register usage quota for each procedure responsive to the determined stacked register usage characteristics of each procedure relative to at least the stacked register usage characteristics of other procedures of the plurality of procedures; and
    allocating stacked register usage to each procedure responsive to the stacked register usage quota of each procedure.

2. The method of claim 1, wherein determining the stacked register usage characteristics of each procedure comprises:
    performing a first pass of the program;
    determining a total stacked register usage of each procedure based on the first pass; and
    determining a total load and spill cycles saved by each procedure when using the stacked registers based on the first pass.

3. The method of claim 2, wherein determining the stacked register usage quota for each procedure comprises:
    identifying a hotspot procedure, the total stacked register usage of the hotspot procedure being highest relative to other procedures of the plurality of procedures;
    identifying procedures in a hot region extending forward and backward from the hotspot procedure that meet a call threshold; and
    determining the stacked register usage quota for each procedure in the hot region responsive to the total load and spill cycles saved by each procedure in the hot region when using the stacked registers relative to a total cost incurred by the stacked register engine by automatically managing stacked register overflows for each procedure in the hot region.

4. The method of claim 3, further comprising:
    identifying other hotspot procedures of the program;
    identifying other hot regions corresponding to the other hotspots; and
    determining the stacked register usage quota for each procedure in the other hot regions.

5. The method of claim 3, wherein determining the stacked register usage quota for each procedure comprises increasing the stacked register usage quota of the procedure if the total stacked register usage of the procedure does not exceed an upper bound of the stacked registers and the procedure is not self-recursive.

6. The method of claim 3, wherein the total cost incurred by the stacked register engine when operating under a self-recursive procedure when the total stacked register usage of the self-recursive procedure does not exceed an upper bound of the stacked registers is computed by a product of a total invocation frequency of the self-recursive procedure and a cost incurred for each stacked register overflow.

7. The method of claim 6, comprising increasing the stacked register usage quota of the self-recursive procedure if the load and store cycles saved by the self-recursive procedure exceeds the total cost incurred by the stacked register engine when operating under the self-recursive procedure.

8. The method of claim 6, comprising reducing the stacked register usage of the self-recursive procedure if the load and store cycles saved by the self-recursive procedure does not exceed the total cost incurred by the stacked register engine when operating under the self-recursive procedure.

9. The method of claim 3, wherein determining the stacked register usage quota for each procedure comprises increasing the stacked register usage quota of each procedure if the total stacked register usage of the procedure exceeds or is equal to an upper bound of the stacked registers and the load and store cycles saved by the procedure is greater than the total cost incurred by the stacked register engine when operating under the procedures in the hot region.

10. A method of stacked register allocation comprising:
performing an intra-procedural stacked register allocation analysis of a plurality of procedures of a program, wherein any stacked register overflow caused by the program is automatically managed by a stacked register engine;
performing an inter-procedural stacked register allocation quota analysis for the plurality of procedures responsive to the intra-procedural stacked register allocation analysis; and
allocating stacked register usage to each procedure of the plurality of procedures responsive to the intra-procedural stacked register allocation quota analysis.

11. The method of claim 10, wherein performing an intra-procedural stacked register allocation quota analysis comprises:
performing a first pass of the program;
determining a total stacked register usage of each procedure based on the first pass; and
determining a total load and spill cycles saved by each procedure when using the stacked registers based on the first pass.

12. The method of claim 11, wherein performing an inter-procedural stacked register allocation quota analysis comprises:
identifying a hotspot procedure of the program, the total stacked register usage of the hot spot procedure being highest relative to the other procedures of the program;
identifying a hot region containing the hotspot procedure, the hot region defined by procedures within a call intensive trace to and from the hotspot procedure; and
determining the stacked register usage quota for each procedure in the hot region responsive to the total load and spill cycles saved by each procedure in the hot region when using the stacked registers relative to a total cost incurred by the stacked register engine by automatically managing stacked register overflows for each procedure in the hot region.

13. The method of claim 12, further comprising:
identifying other hotspot procedures of the program;
identifying other hot regions corresponding to the other hotspots; and
determining a stacked register usage quota for each procedure in the other hot regions.

14. The method of claim 12, wherein determining the stacked register usage quota for each procedure comprises increasing the stacked register usage quota of the procedure if the total stacked register usage of the procedure does not exceed an upper bound of the stacked registers and the procedure is not self-recursive.

15. The method of claim 12, wherein the total cost incurred by the stacked register engine when operating under a self-recursive procedure when the total stacked register usage of the self-recursive procedure does not exceed an upper bound of the stacked registers is computed by a product of a total invocation frequency of the self-recursive procedure and a cost incurred for each stacked register overflow.

16. The method of claim 15, comprising increasing the stacked register usage quota of the self-recursive procedure if the load and store cycles saved by the self-recursive procedure exceeds the total cost incurred by the stacked register engine when operating under the self-recursive procedure.

17. The method of claim 15, comprising reducing the stacked register usage of the self-recursive procedure if the load and store cycles saved by the self-recursive procedure does not exceed the total cost incurred by the stacked register engine when operating under the self-recursive procedure.

18. The method of claim 12, wherein determining the stacked register usage quota for each procedure comprises increasing the stacked register usage quota of each procedure if the total stacked register usage of the procedure exceeds or is equal to an upper bound of the stacked registers and the load and store cycles saved by the procedure is greater than the total cost incurred by the stacked register engine when operating under the procedures in the hot region.

19. A computer system comprising:
a processor having a plurality of stacked registers;
a memory adapted to communicate with the stacked registers;
a stacked register engine implemented on the processor and adapted to automatically manage spill of the stacked registers to the memory and load from the memory to the stacked registers; and
a stacked register allocation algorithm executed in the processor and adapted to allocate stacked register usage to each procedure of a plurality of procedures in a program.

20. The computer system of claim 19, the stacked register allocation algorithm comprising:
an intra-procedural stacked register allocation section executed in the processor and adapted to determine stacked register usage characteristics of each procedure;
an inter-procedural stacked register allocation section executed on the processor and adapted to determine a stacked register usage quota for each procedure responsive to the stacked register usage characteristics of each procedure relative to at least the stacked register usage characteristics of other procedures of the plurality of procedures; and
a stacked register usage allocation section executed on the processor and adapted to allocate stacked register usage to each procedure of the plurality of procedures responsive to the stacked register usage quota for each procedure.

21. The computer system of claim 19, wherein the stacked register allocation algorithm is adapted to allocate stacked register usage to each procedure in the program at least based upon load from the memory and spill to the memory cycles saved by each procedure of the program and a cost incurred by the stacked register engine automatically managing overflow of the stacked registers to the memory.

22. An article comprising a tangible machine-accessible medium having stored thereon instructions that, when executed by a machine, cause the machine to:
determine stacked register usage characteristics of stacked registers of a processor by each procedure of a plurality of procedures of a program;
determine a stacked register usage quota for each procedure responsive to the determined stacked register usage characteristics of each procedure relative to at least the stacked register usage characteristics of other procedures of the plurality of procedures; and
allocate stacked register usage to each procedure responsive to the stacked register usage quota of each procedure.

23. The article of claim 22, having further instructions that, when executed by the machine to determine the stacked register usage characteristics of the stacked registers of the processor by each procedure of a plurality of procedures of the program, cause the machine to:
perform a first pass of the program;
determine a total stacked register usage of each procedure based on the first pass; and
determine a total load and spill cycles saved by each procedure when using the stacked registers based on the first pass.

24. The article of claim 23, having further instructions that, when executed by the machine to determine a stacked register usage quota for each procedure, cause the machine to:
identify a hotspot procedure, the total stacked register usage of the hotspot procedure being highest relative to other procedures of the plurality of procedures;
identify procedures in a hot region extending forward and backward from the hotspot procedure that meet a call threshold; and
determine the stacked register usage quota for each procedure in the hot region responsive to the total load and spill cycles saved by each procedure in the hot region when using the stacked registers relative to a total cost incurred by the stacked register engine by automatically managing stacked register overflows for each procedure in the hot region.

25. The article of claim 24, having further instructions that, when executed by the machine, cause the machine to:
identify other hotspot procedures of the program;
identify other hot regions corresponding to the other hotspots; and
determine the stacked register usage quota for each procedure in the other hot regions.

26. The article of claim 24, having further instructions that, when executed by the machine, cause the machine to increase the stacked register usage quota of the procedure if the total stacked register usage of the procedure does not exceed an upper bound of the stacked registers and the procedure is not self-recursive.

27. The article of claim 24, having further instructions that, when executed by the machine, cause the machine to compute a product of a total invocation frequency of the self-recursive procedure and the cost incurred for each stacked register overflow, wherein the computed product is a cost incurred by the stacked register engine when operating under a self-recursive procedure when the total stacked register usage of the self-recursive procedure does not exceed an upper bound of the stacked registers.

28. The article of claim 27, having further instructions that, when executed by the machine, cause the machine to increase the stacked register usage quota of the self-recursive procedure if the load and store cycles saved by the self-recursive procedure exceeds the total cost incurred by the stacked register engine when operating under the self-recursive procedure.

29. The article of claim 27, having further instructions that, when executed by the machine, cause the machine to reduce the stacked register usage of the self-recursive procedure if the load and store cycles saved by the self-recursive procedure does not exceed the total cost incurred by the stacked register engine when operating under the self-recursive procedure.

30. The article of claim 24, having further instructions that, when executed by the machine to determine a stacked register usage quota for each procedure, cause the machine to increase the stacked register usage quota of each procedure if the total stacked register usage of the procedure exceeds or is equal to an upper bound of the stacked registers and the load and store cycles saved by the procedure is greater than the total cost incurred by the stacked register engine when operating under the procedures in the hot region.

* * * * *